Patented Dec. 19, 1939

2,183,629

UNITED STATES PATENT OFFICE 2,183,629

COMPOUNDS OF THE DIBENZANTHRONE SERIES

Otto Stallmann, Bridgeton, N. J., assignor to E. I. du Pont de Nemours & Company, Wilmington, Del., a corporation of Delaware No Drawing. Application May 25, 1938, Serial No. 209,994

6 Claims. (Cl. 260—355)

This invention relates to the preparation of new and valuable compounds of the dibenzanthrone and isodibenzanthrone series and more particularly to the preparation of organic ester derivatives of the alkylol ethers of the nuclear hydroxy derivatives of dibenzanthrone and isodibenzanthrone.

In co-pending application Serial No. 209,991, the preparation of alkylol derivatives of the reduction products of the dibenzanthrone series is described. In co-pending application Serial No. 209,992, the alkylol derivatives of Bz-2,Bz-2'-dihydroxydibenzanthrone and Bz-2,Bz-2'-dihydroxyisodibenzanthrone are described. In all of these compounds the alkyl side chain contains a hydroxyl group which may be further esterified.

This invention has for its object the preparation of new and valuable color bodies of the dibenzanthrone and isodibenzanthrone series which are soluble in organic solvents and oils, fats, etc., and which may therefore be employed in the coloring of materials for which the parent compounds are not suitable.

It is a further object of the invention to render the alkylol ethers of dibenzanthrone and isodibenzanthrone, as more particularly described in co-pending applications Serial Nos. 209,991 and 209,992, very soluble in oils, organic solvents, etc., by the introduction of aliphatic acid ester groups into the molecule.

I have found that the dibenzanthrone and isodibenzanthrone alkylene oxide ether derivatives may be esterified with aliphatic acid chlorides or anhydrides to give aliphatic ester ether derivatives which are very soluble in oils, fats, waxes, and inert organic solvents, such as benzene, toluene, xylene, etc., and which are therefore valuable for the coloring of oils, fats, waxes, plastic masses, cellulose compounds, etc., for which purpose the original vat dyes as such are not suitable and for which the unesterified alkylol ethers do not give the desirable strong coloration.

All of these ester-ether derivatives of the dibenzanthrone and isodibenzanthrone series are insoluble in water and stable under ordinary conditions. They are unstable in concentrated sulfuric acid and are also saponified when treated with alcoholic caustic or strong alkaline hydrosulfite solutions at high temperatures. When dissolved in organic solvents and other materials, they all show a very strong and desirable fluorescence ranging from a bright greenish yellow through orange and red to brown. In transmitted light, such solutions of the leuco-ether esters of this class range from yellowish orange through pink and deep red to violet, whereas the (ketonic) monoalkylolether esters give bright blue solutions with reddish fluorescence.

The reaction is preferably carried out in solvents in which the alkylol ether of the dibenzanthrone compounds is soluble. The alkylol ether of the dibenzanthrone compounds dissolved in the solvent may be reacted directly with the aliphatic acid chloride or anhydride at relatively low temperatures. The reaction is facilitated by the addition of pyridine which forms an addition product with the acid chloride or anhydride.

The conditions under which the esterification of the side chain hydroxyl groups takes place depends upon the esterifying agent, that is whether the acid chloride, or anhydride, is employed. The reaction with the acid anhydrides is preferably carried out at or slightly under reflux temperatures of the solvent employed as the reaction medium in order to obtain the maximum dissolving power, thereby permitting the use of less amounts of solvent than would be used at lower temperatures. Where solvents such as nitrobenzene are used the temperature may be as high as 200° C. With acid chlorides the reaction takes place readily even in the cold, particularly in the presence of pyridine. Temperatures of from 70 to 140° C. have been found to give satisfactory results with either the acid chloride or acid anhydride.

Where the dibenzanthrone- or isodibenzanthronealkylolether contains a free OH group in the benzanthrone nucleus, esterification of such hydroxyl group also takes place, giving compounds having good solubility in oils and organic solvents.

The following examples are given to illustrate the invention more fully. The parts used are by weight.

*Example 1*

10 parts of the dry ethanol ether of the stable reduction product of dimethoxydibenzanthrone (described below and more particularly described in Example 1 of co-pending application Serial No. 209,991 are dissolved in 300 parts of solvent naphtha and to the solution are added 50 parts of acetic anhydride. The mass is then heated to reflux temperatures (130 to 140° C.) and agitated at this temperature for one-half hour, cooled to 100° C. and filtered. The filtrate is steam distilled free from solvent and the residual semisolid mass is dried at steam bath temperatures.

The product thus obtained is soluble in oil and gasoline in moderate concentrations with a reddish orange color in transmitted light, exhibiting a very strong and bright reddish yellow fluorescence in reflected light.

By substituting for the acetic anhydride in the above esterification 30 parts of crude lauric acid chloride (the chlorides of the mixed coconut oil acids), the crude lauric acid ester of the (beta-hydroxyethyl) ether of leuco-dimethoxydibenzanthrone is obtained, which is a red solid, possessing a very similar stability, shade and fluoresence, but much greater solubility in oil and gasoline than the above described acetyl derivative.

The ethanol ether of the stable reduction product of dimethoxydibenzanthrone employed in this example may be prepared by the procedure more particularly described in co-pending application Serial No. 209,991. The following specific procedure may be employed:

50 parts of the dry, stable leuco derivative of dimethoxydibenzanthrone (see co-pending application Serial No. 186,750) are suspended in a solution of 68 parts of ethylene oxide in 250 parts of dry benzene. The mass is heated in an iron autoclave with agitation for 8 hours at 130 to 140° C., and then cooled to room temperature. 10 parts of soda ash are then added and the mass is steam distilled free from solvent. The residual aqueous suspension is filtered and the filter cake washed alkali free with water and dried.

The stable reduction product of dimethoxydibenzanthrone may be prepared by the process described in co-pending application Serial No. 186,750 now U. S. Patent 2,148,042. As a specific example of this process, 100 parts of dimethoxydibenzanthrone are vatted in 4500 parts of water at 60° C., employing 100 parts of sodium hydroxide and 100 parts of technical sodium hydrosulfite. To this vat, there are slowly added under agitation 150 parts of sodium bisulfite while the temperature is maintained at 70 to 80° C. On continued heating, an olive colored stable leuco derivative is precipitated which, after cooling, is filtered off and dried, and may be subjected to the etherification process as above described.

*Example 2*

15 parts of the ethanol ether of the stable reduction product of Bz-2,Bz-2'-dimethoxydibenzanthrone as more particularly described in Example 1 are heated with 15 parts of crude lauric acid chloride in 150 parts of solvent naphtha and in the presence of 20 parts of soda ash (or an equivalent molecular quantity of pyridine) at reflux temperature for 3 hours. The solution is filtered to remove inorganic salt, and other solvent insoluble impurities, the filtrate is steam distilled to free from solvent naphtha. The water is decanted off and the residue is dried.

The capric, caprylic, oleic and stearic acid esters of the stable leuco dimethoxydibenzanthrone ethanol ether may be prepared in a similar manner by employing equivalent amounts of the respective acid chlorides. All of these long chain aliphatic esters of the ethanol ether of the stable leuco derivative of dimethoxydibenzanthrone are soluble in oils and gasoline with a reddish orange color in transmitted light, exhibiting strong reddish yellow fluorescence in reflected light, and are all stable under ordinary conditions.

*Example 3*

The propanol ether of the stable reduction product of the ethylene dibromide alkylation derivative of Bz-2,Bz-2'-dihydroxydibenzanthrone (prepared by reacting the stable leuco derivative with propylene oxide in the same manner as illustrated in Example 1 and as more particularly described in Example 12 of co-pending application Serial No. 209,991 may be esterified with any of the long chain aliphatic acid chlorides by the same procedure as illustrated in Example 1 or 2 to give products which exhibit similar solubility in organic solvents, oils, fats, waxes, etc., and which exhibit desirable yellowish red fluorescence in reflected light.

*Example 4*

100 parts of dry purified dihydroxydibenzanthrone (in powder form) are suspended in 4000 parts of water, containing 150 parts of sodium hydroxide in solution. 150 parts of sodium hydrosulfite are added to the suspension at 60° C. and the vat is stirred at 60 to 65° C. for one-half hour and then filtered at 60° C.

To the clear filtrate is added 150 parts of sodium bisulfite and the resulting solution is treated with a very slow and uniform stream of carbon dioxide gas under agitation while the temperature is maintained at 65 to 70° C. for four hours, or until the precipitation of the sodium salt of the stable reduction product is complete.

The precipitate is filtered off and the cake washed with 1000 parts of cold water and dried giving the monosodium salt of the stable reduction product of dihydroxydibenzanthrone, more particularly described in Example 1 of co-pending application Serial No. 209,990.

50 parts of this dry monosodium salt of the stable reduction product are charged into an iron autoclave. 200 parts of ethylene oxide are then introduced and the charge is heated under pressure at 125° C. for 12 hours and then cooled to room temperature and diluted with 6000 parts of water.

The water insoluble semi-solid reaction product is isolated by pouring off the water layer, leaving a deep red colored residue which is dried at 100° C.

This ethanol ether of the stable reduction product of Bz-2,Bz-2'-dihydroxydibenzanthrone may be esterified as follows:

10 parts of the dry product are dissolved in 150 parts of solvent naphtha and 20 parts of crude lauric acid chloride (obtained by reacting crude coconut oil acids with thionyl chloride) are dropped slowly into the agitated solution at 80 to 90° C.

The mass is further heated at reflux temperatures (138° C.) for one hour and then cooled and filtered at 25° C. The filtrate is diluted with a solution of 20 parts of soda ash in water and the solvent is removed by steam distillation. The residual water insoluble product is separated from the water layer by decantation. The dry reaction product is soluble in "Nujol" oil, with a strong red fluorescence.

*Example 5*

A similar oil fluorescent red is obtained, when 10 parts of the same dry beta-hydroxyethyl ether of the stable reduction product of Bz-2,Bz-2'-dihydroxydibenzanthrone described in Example 4 are refluxed for 3 hours at 138° C. with an excess of a solution of oleic acid chloride (obtained by reacting 15 parts of oleic acid dissolved in 150 parts of solvent naphtha with 15 parts of thionyl chloride at reflux temperatures, and distilling off the excess of thionyl chloride at 133° C.). The deep red colored oleic acid ester of the hydroxyethyl ether of the stable reduction product of dihydroxydibenzanthrone is isolated in the same manner as described above in the preparation of the corresponding crude lauric acid ester.

Example 6

The caprylic acid ester of the same beta-hydroxyethyl ether of the stable reduction product of Bz-2,Bz-2'-dihydroxydibenzanthrone may be prepared by refluxing for one hour at 133° C., 10 parts of the dry hydroxyethyl ether with 20 parts of caprylic acid chloride, (obtained by reacting thionyl chloride with the lowest boiling cut of the crude coconut oil acids, which were fractionated by distillation), in 150 parts of solvent naphtha. The caprylic acid ester is isolated by filtering the solution and then steam distilling the filtrate free from solvent after the addition of 25 parts of soda ash to the filtrate. The clear water layer is poured off from the deep red colored semi-solid residue which is dried at 100° C. The product dissolves in oils and organic solvents with a violet red color and exhibits a strong yellowish red fluorescence in reflected light.

Example 7

The press cake of the monosodium salt of the stable reduction product of Bz-2,Bz-2'-dihydroxydibenzanthrone, described in Example 1 of application Serial No. 209,990, is converted to the free hydroxy derivative by stirring 1 part (dry basis) with 0.5 part of acetic acid in 30 parts of water for an hour. It is then filtered, washed with water, and dried. (See Example 5 of application Serial No. 209,990.)

47 parts of this free hydroxy compound are heated in 400 parts of dry benzene with 70 parts of ethylene oxide in an autoclave under agitation for 12 hours, at 160 to 165° C. and at a pressure of about 135 lbs. per square inch. After cooling and settling, the benzene layer is poured off and the remaining semi-solid reaction product comprising the alkylol ether of the stable reduced dihydroxydibenzanthrone is heated with 47 parts of dry pyridine to 80° C. 94 parts of crude lauric acid chloride are now added slowly to the mass, which is stirred at 80 to 90° C. and finally heated to 120 to 125° C. for one hour. The esterification mass is then cooled to 70° C. 100 parts of benzene are added and the temperature kept at reflux (80° C.) for one-half hour. 500 parts of benzene are then added and the deep red colored, clear solution is cooled to room temperature and filtered to remove a very small amount of solvent insoluble impurities. The filtrate is steam distilled with an excess of aqueous ammonia and the water-insoluble lauric acid ester of the beta-hydroxy ether of the stable reduction product is isolated in the form of a soft, deep red colored mass, containing some lauramide as impurity. The lauramide may be removed from the reaction product by extraction with alcohol, in which the laurate of the hydroxy ether is practically insoluble. The dry product thus obtained exhibits the same properties as the lauric acid ester described in Example 4.

Example 8

An amount of a technical filter press cake, containing a slight trace of free sulfuric acid and 40 parts of the purified Bz-2,Bz-2'-dihydroxydibenzanthrone, is stirred into 500 parts of solvent naphtha and the mass is distilled free from water until a final temperature of 130° C. is reached, and then cooled below 30° C. To the remaining dry suspension of dihydroxydibenzanthrone, there are added 60 parts of propylene oxide, dissolved in 200 parts of dry solvent naphtha, and the mass is heated in an iron autoclave under agitation for 12 hours at 150 to 155° C. and at an average pressure of 50 lbs. per square inch. The reaction mass is then steam distilled free from solvent and filtered. The filter cake is washed with cold water and dried at 100° C. This crude mono-propanolether of dihydroxydibenzanthrone may be purified by dissolving 20 parts of the dry product in 400 parts of o-dichlorobenzene at 170 to 175° C., filtering the solution in order to remove small amounts of solvent insoluble impurities, steam distilling the filtrate free from solvent, pouring off the water, and drying the remaining product at 100° C. 15 parts of this purified monoether derivative are dissolved or suspended in 150 parts of solvent naphtha, containing 15 parts of soda ash in suspension. The mass is heated to reflux temperatures (125 to 130° C.) and 23 parts of the crude lauric acid chloride are then added slowly within one hour at reflux temperatures. After heating for another hour at 135 to 140° C., the solution is cooled and filtered at room temperature. The filtrate is steam distilled free from solvent and the residual semi-solid mass is separated from the water layer by decantation, and dried at 100° C. It may be further purified by extraction with cold methanol, in which the laurate of the color is insoluble. The dry, blue colored solid thus obtained is readily soluble in oils, gasoline, waxes, artificial resins and other organic material with a strong violet blue coloration, exhibiting a red fluorescence.

Example 9

40 parts of technical Bz-2,Bz-2'-dihydroxydibenzanthrone are suspended in 300 parts of solvent naphtha containing 60 parts of cyclohexene oxide in solution. The mass is heated under agitation in an autoclave at 150 to 155° C. for 12 hours and then cooled to room temperature. The reaction product, which is precipitated in the crude reaction mass in the form of large well defined blue crystals, is filtered off, the cake is washed free from solvent naphtha with alcohol and dried at 100° C. The product may be further purified by dissolving 15 parts of these crystals in 400 parts of boiling o-dichlorobenzene, filtering the solution at 160 to 170° C. and allowing the filtrate to cool to room temperature.

This mono-cyclohexanol ether of Bz-2,Bz-2'-dihydroxydibenzanthrone when reacted with lauric acid chloride by the method described in Example 8 gives a blue colored solid which is very soluble in oils, waxes, fats, organic solvents such as benzene, toluene, etc., and which is especially suitable for coloring gasoline, cellulose acetate, and many plastic masses and artificial masses in a strong and bright blue color, which exhibit a reddish fluorescence in reflected light.

Example 10

The beta-hydroxypropyl ether and the corresponding cyclohexyl ether of dihydroxyisodibenzanthrone, as prepared according to Examples 6 and 7 of co-pending application Serial No. 209,992 are converted into oil and gasoline soluble colors which give in such solvents blue shades in transmitted light and strong brownish red fluorescence in reflected light, by esterifying the products with crude lauric acid chloride by the procedure illustrated in the previous example.

Other inert organic solvents or organic bases, such as pyridine, piperidine, quinoline, dimethylaniline, in which the alkylol ether of the dibenzanthrone compound is soluble may be employed for this reaction. The amount of acylating agent may vary widely, sufficient of course being employed to give the desired degree of acylation. For complete esterification only a small amount in excess of that theoretically required need be employed, although a large excess may be employed without detriment to the process. Alkaline condensing agents, such as soda ash, potassium carbonate, alkali acetate, etc., may be employed in the reaction with the acide chlorides, although their use is not necessary.

All of the esters prepared by this process, when dissolved in oils, fats, plastic masses, etc., give bright shades in transmitted light, and exhibit a strong fluorescence in reflected light. Any of the acid chlorides of the aliphatic and cycloaliphatic series containing from 2 to 18 carbon atoms, such as those obtained from caprylic, capric, palmitic, stearic, oleic, hyrdoabietic acids may be substituted for those employed in the specific examples to give valuable fluorescent colors. In the esterification of the monoalkylol ethers of dibenzanthrone, esterification also takes place on the substituted hydroxy group in the Bz-2' position. The compounds exhibit good solubility and fluorescent properties irrespective of whether the ether linkage is attached to hydroxyl groups in the meso-carbon atoms or elsewhere in the dibenzanthrone molecule, although the colors imparted by the compounds vary, depending on their particular constitution.

By the term "alkylol ethers" in this specification, I refer to both the open and closed chain aliphatic ether radicals which carry a free hydroxy group.

I claim:

1. Aliphatic acid esters of alkylol ethers of the class consisting of beta-hydroxyalkyl and beta-hydroxycyclo-alkyl ethers of the dibenzanthrone and isodibenzanthrone series, said aliphatic acid ester group being attached to the hydroxy radical of the alkylol ether side chain.

2. Aliphatic acid ester-ethers of dibenzanthrone which carry at least one aliphatic acid ester group attached to the hydroxyl radical of an ether side chain of the class consisting of beta-hydroxyalkyl and beta-hydroxycyclo-alkyl radicals on the dibenzanthrone nucleus, and one aliphatic acid ester group attached directly to the dibenzanthrone nucleus.

3. The aliphatic acid esters of leuco alkylol ethers of Bz-2,Bz-2'-dimethoxydibenzanthrone.

4. The aliphatic acid esters of the mono-cyclohexanol ether of Bz-2,Bz-2'-dihydroxydibenzanthrone.

5. Aliphatic acid esters of leuco alkylol ethers of the class consisting of beta-hydroxyalkyl and beta-hydroxycyclo-alkyl ethers of dibenzanthrone and isodibenzanthrone which carry the aliphatic acid ester group attached through the hydroxy radical of an alkylol ether side chain, which ether side chain is attached through the leuco oxygen of the dibenzanthrone or isodibenzanthrone molecule.

6. The process for preparing aliphatic acid esters of alkylol ethers of dibenzanthrone and isodibenzanthrone compounds which comprises treating an ether of the class consisting of beta-hydroxyalkyl and beta-hydroxycyclo-alkyl ethers of the dibenzanthrone compound with a compound of the class consisting of aliphatic acid chlorides and anhydrides until esterification of the free hydroxyl radicals present in the dibenzanthrone compound is completed.

OTTO STALLMANN.